United States Patent
Thomson

(10) Patent No.: US 7,560,893 B2
(45) Date of Patent: Jul. 14, 2009

(54) DUAL MODE STEPPER MOTOR

(75) Inventor: Barry Thomson, Norval (CA)

(73) Assignee: Xerox Corporation, Norwalk, CT (US)

( * ) Notice: Subject to any disclaimer, the term of this patent is extended or adjusted under 35 U.S.C. 154(b) by 129 days.

(21) Appl. No.: 11/761,554

(22) Filed: Jun. 12, 2007

(65) Prior Publication Data

US 2008/0309274 A1 Dec. 18, 2008

(51) Int. Cl.
*G05B 19/40* (2006.01)
*H02P 6/20* (2006.01)

(52) U.S. Cl. ............. 318/685; 318/400.11; 318/400.12; 318/439

(58) Field of Classification Search ............ 318/400.11, 318/400.12, 685, 694; 388/804; 702/106
See application file for complete search history.

(56) References Cited

U.S. PATENT DOCUMENTS

| | | | |
|---|---|---|---|
| 4,587,473 A | | 5/1986 | Turvey |
| 4,588,936 A | * | 5/1986 | Itoh et al. .................... 318/694 |
| 4,689,540 A | * | 8/1987 | Tani et al. .................... 318/608 |
| 4,743,815 A | * | 5/1988 | Gee et al. .............. 318/400.11 |
| 6,032,004 A | | 2/2000 | Mirabella, Jr. et al. |
| 7,154,245 B2 | | 12/2006 | Coutu et al. |
| 7,205,738 B2 | * | 4/2007 | Chapman et al. ........ 318/400.12 |
| 7,340,158 B2 | * | 3/2008 | Zeh et al. ..................... 388/804 |
| 2004/0249596 A1 | * | 12/2004 | Ho .............................. 702/106 |
| 2005/0212472 A1 | * | 9/2005 | Chapman et al. ............. 318/439 |
| 2008/0278101 A1 | * | 11/2008 | Shahi et al. ............ 318/400.11 |

* cited by examiner

*Primary Examiner*—Paul Ip
(74) *Attorney, Agent, or Firm*—Gibb I.P. Law Firm, LLC

(57) ABSTRACT

A method and structure receives a desired rotational speed and/or step frequency for an electric motor. If the desired rotational speed is above a predetermined limit, the method performs closed-loop mode control of coil current of the electric motor by varying the average voltage supplied to the electric stepper motor according to observed feedback current from the current feedback loop connected to the electric stepper motor. To the contrary, if the desired rotational speed is not above the predetermined limit, the method performs open-loop mode control of coil current of the electric stepper motor by setting the average voltage supplied to the electric stepper motor according to values computed from the step frequency, irrespective of the observed feedback current from the current feedback loop.

20 Claims, 2 Drawing Sheets

DUAL MODE STEPPER MOTOR

BACKGROUND AND SUMMARY

Embodiments herein generally relate to structures and methods that control the speed of electric motors such as stepper motors, and more particularly to an improved motor and method that utilizes two modes to reduce vibrations and noise of such motors.

Where perfect speed control is required, hybrid stepper motors are often chosen for their precision, in order to minimize vibration. However, even with micro-stepping techniques, vibration continues to be a challenge with popular drive circuitry, as does limitations on the useable range of speed. This disclosure explains how standard drive circuit topology can be used along with enhanced control logic to accomplish very low vibration operation over an unprecedented range of speed.

When a stepper motor is used to produce continuous motion, it periodically updates the electrical signal supplied to the coils. To keep the torque constant and the angular increment regular, the coils of a 2-phase bipolar wound motor (a very common stepper motor arrangement) are driven such that the currents in those coils approximate a sine wave and a cosine wave.

These waveforms, illustrated in FIG. 1, are normally produced using a digital lookup table that is indexed by a counter, and whose output is converted to an analog signal that controls the driver circuit. The same table may be used to produce the signals for both motor coils, when the motor coils are indexed by a pair of pointers (or counters) that are always pointing to positions in the table that are separated by a quarter of the range, hence producing sine and cosine functions of the counter value. As the counter increments at a given frequency, the motor spins at a corresponding speed. If the counter is decrementing, the motor direction is reversed.

With respect to the effects of vibration, free (unloaded) stepper motors can be set to move to any position at any torque by controlling the coil currents. This is sometimes called the electrical position. However the mechanical position of a torque loaded motor will stray from this by a positional error called the load angle, as shown in FIG. 2. The load angle sets the stage for harmonic motion. Since any imperfection causing noise at the resonant frequency can build up this oscillation amplitude, what is needed is a damping mechanism.

One exemplary apparatus embodiment herein that provides damping to reduce such oscillation comprises a dual-mode controller operatively connected to an electric motor. The controller is adapted to supply a pattern of voltage to the electric motor. Further, the controller has an input/output for receiving a desired rotational speed and step frequency of the electric motor. A current feedback loop is connected to the electric motor and the controller.

The controller operates in two different modes, a high-speed, closed-loop mode and a low-speed, open-loop mode. Thus, the controller is adapted to perform closed-loop mode control of coil current of the electric motor by varying the average voltage supplied to the electric motor according to observed feedback current from the current feedback loop, if the desired rotational speed is high enough (e.g., above a predetermined limit). However, when the desired rotational speed is slow enough (e.g., not above the predetermined limit) the controller is adapted to perform open-loop mode control of coil current of the electric motor by setting the average voltage supplied to the electric motor according to values computed from the step frequency, irrespective of the observed feedback current from the current feedback loop. The predetermined limit can be either a step frequency or a revolution frequency.

More specifically, the controller is adapted to perform the closed-loop mode control using feedback-based pulse width modulation (PWM) to control the pattern of voltage supplied to the electric motor so as to maintain sinusoidal current waveforms within the electric motor.

However, the controller performs the open-loop mode control to supply, from the controller to the electric motor, sinusoidal voltage waveforms matching desired sinusoidal current waveforms corresponding to the desired rotational speed. The current feedback loop is adapted to provide over-current protection during the open-loop mode control.

A method embodiment receives the desired rotational speed and step frequency for the electric stepper motor. If the desired rotational speed is above a predetermined limit, the method performs closed-loop mode control of coil current of the electric stepper motor by varying the average voltage supplied to the electric stepper motor according to observed feedback current from the current feedback loop connected to the electric stepper motor. To the contrary, if the desired rotational speed is not above the predetermined limit, the method performs open-loop mode control of coil current of the electric stepper motor by setting the average voltage supplied to the electric stepper motor according to values computed from the step frequency, irrespective of the observed feedback current from the current feedback loop.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

While the present method and structure will be described in connection with embodiments thereof, it will be understood that this disclosure is not limited to the disclosed embodiments. To the contrary, this disclosure is intended to cover all alternatives, modifications, and equivalents as may be included within the spirit and scope, as defined by the appended claims.

Figure 2:
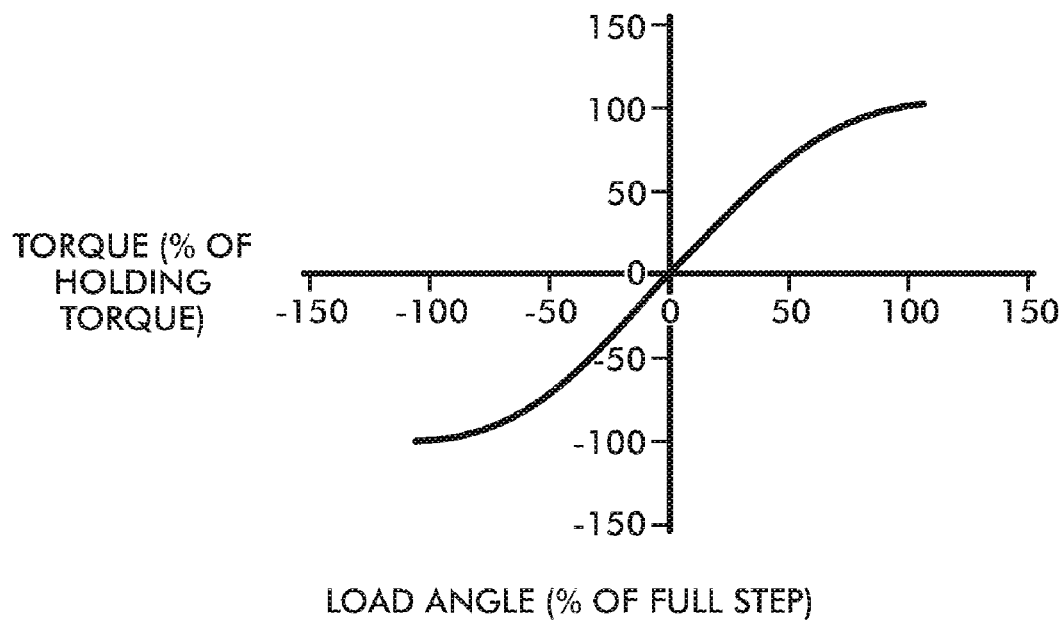
FIG. 2 is a graph illustrating load angle within a stepper motor.

As mentioned above, the load angle shown in FIG. 2 can cause harmonic motion. Since any imperfection causing noise at the resonant frequency can build up this oscillation amplitude, a damping mechanism is needed. Damping occurs when velocity of the load angle causes a force that tends to restore that velocity to zero. Damping may be accomplished mechanically by means of tuned resonant dampers, or electromechanically which is the focus of this disclosure. The feedback of load angle velocity to acceleration force may be accomplished through a simple local loop, or an extravagant remote loop. This disclosure focuses on a simple local loop, since this uses less time delay and therefore has a higher bandwidth of useful response; however, the embodiments herein are applicable to both.

Figure 1:
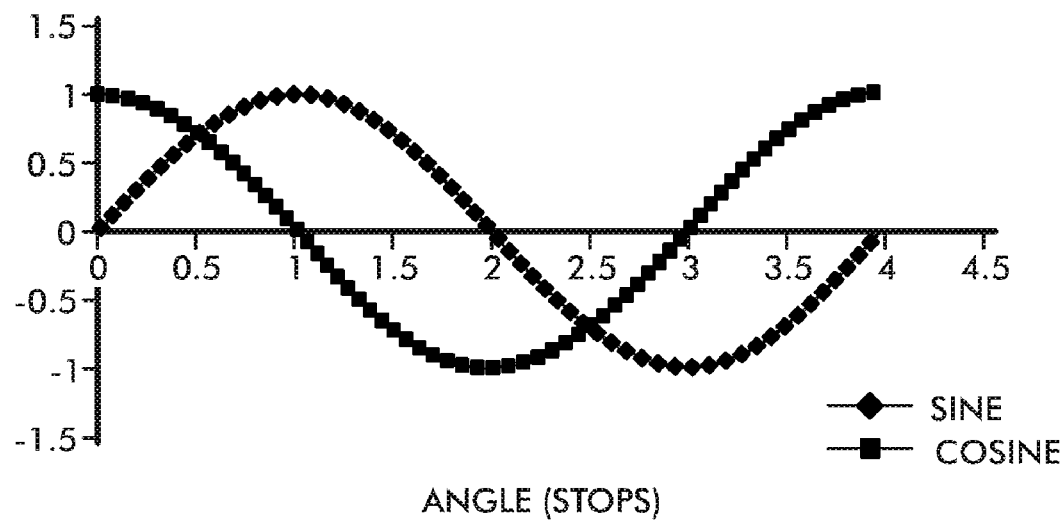
FIG. 1 is a graph illustrating sine and cosine current waveforms supplied to coils of an electric stepper motor.

With respect to sources of vibration, if in the motor construction, the angular increment is kept small, commonly 1/64 of a cycle, and if the amplitude of the coil currents (e.g., FIG. 1) are produced accurately, then a perfect motor should run very smoothly under any constant torque load. However, since the magnetic gaps are commonly so small and critical, any imperfection in the stator or misalignment of the rotor will cause deviations from the ideal waveforms, or a mismatch of the torque per amp produced by the two coils. Even the coil winding process has problems controlling wire resistance, and hence can cause more mismatch. It is therefore common for small motors to show coil responses that are mismatched by up to several percent.

The widely available Chopper Current Controlling drivers (closed-loop mode) use pulse width modulation (PWM) to reduce a high supply voltage to an average motor voltage. For a complete discussion of stepper motor control circuits, see U.S. Pat. Nos. 4,587,473 and 7,154,245, the complete disclosures of which are incorporated herein by reference. Such drivers vary the supply voltage, according to current feedback, to compensate for the back electromotive forces (EMF) that change as the velocity varies, as required to maintain current waveforms of the correct amplitude. However, such conventional circuitry often encounters problems with mismatch of current sensing resistors, voltage offsets of feedback comparators, accuracy of D/A converters, asymmetrical current driving, and an inherent dead band.

Figure 3:
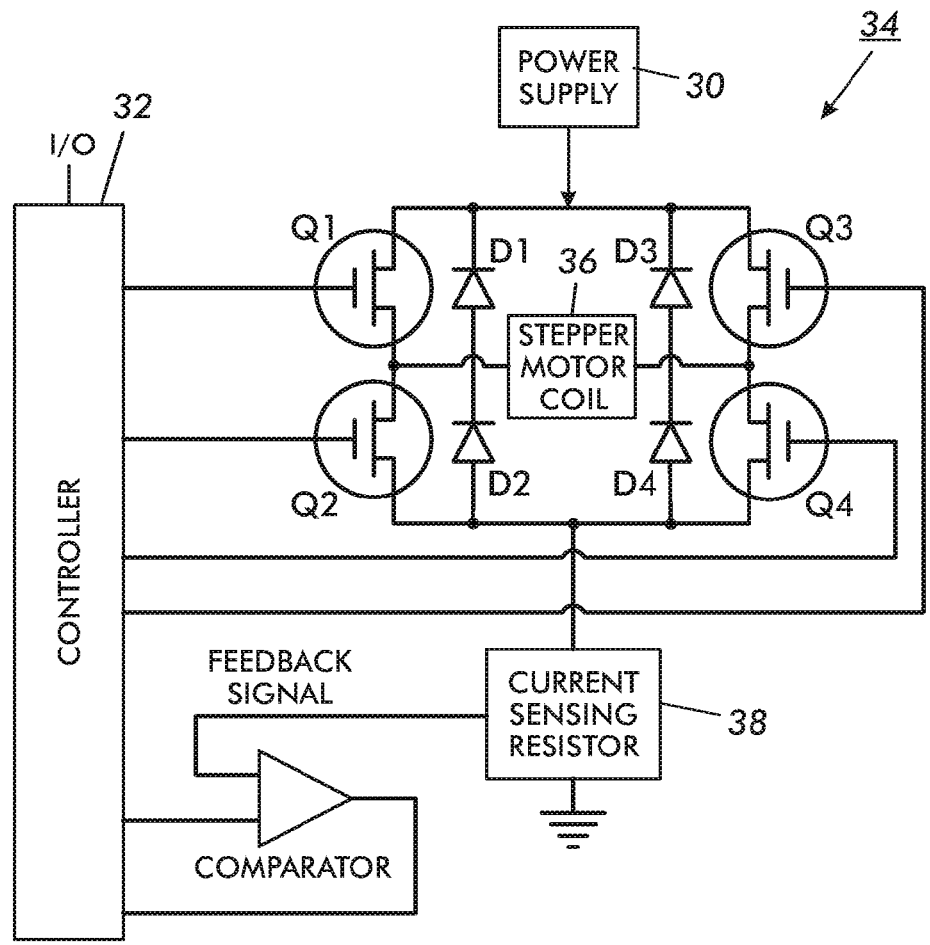
FIG. 3 is a schematic diagram of a stepper motor and controller.

The "H" bridge circuit 34, shown in FIG. 3, is an output stage of a driver used for each coil of a bipolar wound stepper motor 36 and is made up of a H pattern of transistors Q1-Q4 and diodes D1-D4. The driver uses or includes some form of central processing unit or controller 32 operatively (directly or indirectly) connected to the bridge circuit 34. However, the controller 32 shown in FIG. 3 is unique because of its ability to operate the bridge circuit 34 as a closed-loop system at high speeds and an open-loop system at low speeds.

The bridge circuit 34 is operatively connected to a power supply 30 and outputs the appropriate voltage/current to the stepper motor 36. A current sensing resistor 38 produces a feedback signal which is fed back to the controller 32 through a comparator. The feedback signal represents the magnitude of coil current in the direction that it is being driven, during the "on-time", when either diagonal pair of transistors (Q1; Q4 or Q2; Q3) are turned on. This is called the forward current of the motor coil, knowing that the actual direction depends on what is the intended direction at any given time. The actual pair of diagonal transistors selected determines the driving direction on the coil.

During "off-time", the forward coil current either does not go through the sense resistor 38, or flows backward through the sense resistor 38, depending on the states of the four transistors Q1 through Q4. For this feedback signal to be used, it is interpreted in synch with the "on-time", and compared with a desired level, in order to determine when to switch the transistors Q1-Q4 to the "off-time" state.

When turning on a transistor in the "H" bridge driver circuit, electrical capacitance of the load and the transistor cause a current spike to appear in the sensing resistor 38. As a result, the feedback signal is reversing for some time after turn-on. If turn-off is triggered by feedback levels, then the on-time is restricted to some minimum. In order to accurately control current near the zero point, using a minimum on-time, and a pre-determined off-time, current reversal during the off-time must be prevented. This is done by using the transistors in a combination that never applies the supply voltage in the reverse direction during the off-time.

This causes a form of drive asymmetry where coil current variations are normally not met by any change in the current path, but if it crosses zero when it is not expected to, the path changes. As a result, when motor inductance and loading effects such as back-EMF and load angle cause the current to cross zero at a different time than planned, the circuit responds in a non-linear way, causing torque perturbations in synch with the step rate. These asymmetrical drive paths, again combined with the minimum on-time restriction, also explain the occurrence of "dead-band" (where the feedback loop loses control of the current at low levels near the zero cross). This dead band affects the motor at any speed, even at speeds low enough that back-EMF and inductance are not significant effects.

The conventional Chopper Current Controlling drives (closed-loop mode) are often unable to accurately control current at or near zero. This non-linearity at the zero current crossover points cause vibration, noise, etc. One exemplary apparatus embodiment herein that provides damping solutions to these problems comprises the dual-mode controller 32 operatively connected to the electric motor 36. The controller 32 is operatively connected, and adapted to supply different patterns of voltage to the electric motor 36. Further, the controller 32 has an input/output for receiving a desired rotational speed and step frequency of the electric motor 36. A current feedback loop is operatively connected to the electric motor and the controller 32.

The controller 32 is adapted to perform closed-loop mode control of coil current of the electric motor 36 by varying the average voltage supplied to the electric motor 36 according to observed feedback current from the current feedback loop, if the desired rotational speed is high enough (e.g., above a predetermined limit). However, when the desired rotational speed is slow enough (e.g., not above the predetermined limit) the controller 32 is adapted to perform open-loop mode control of coil current of the electric motor 36 by setting the average voltage supplied to the electric motor 36 according to values computed from the step frequency, irrespective of the observed feedback current from the current feedback loop.

More specifically, the controller 32 is adapted to perform the closed-loop mode control using feedback-based pulse width modulation to control the average voltage supplied to the electric motor 36 so as to maintain sinusoidal current waveforms within the electric motor 36.

However, the controller 32 performs the open-loop mode control to supply, from the power supply 30 to the electric motor 36, sinusoidal voltage waveforms matching desired sinusoidal current waveforms corresponding to the desired rotational speed. The current feedback loop is adapted to provide over-current protection during the open-loop mode control.

Figure 4:
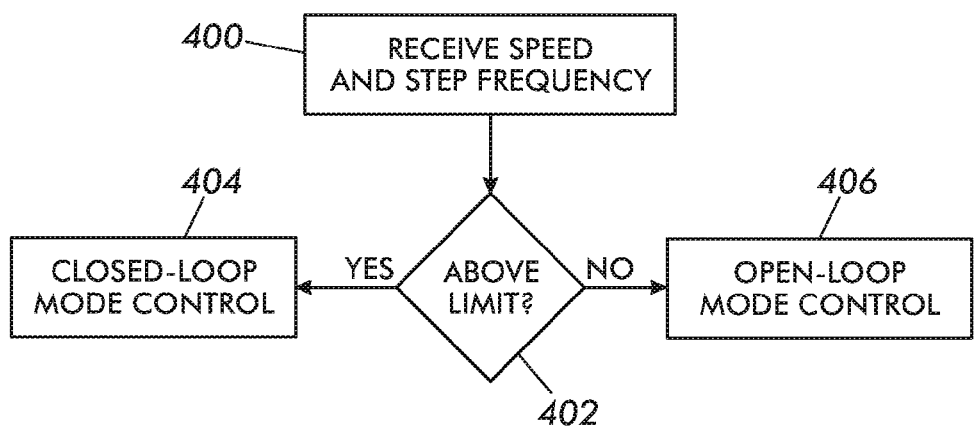
FIG. 4 is a flow diagram illustrating a methodology employed by embodiments herein.

As shown in flowchart form in FIG. 4, a method embodiment receives a desired rotational speed and step frequency of an electric motor (e.g., stepper motor) in item 400. If the desired rotational speed is above a predetermined limit, the decision box 402 directs processing to the closed-loop mode control in item 404. In item 404, the coil current of the electric stepper motor 36 is controlled by varying the average voltage supplied to the electric stepper motor 36 according to observed feedback current from the current feedback loop. To the contrary, as shown by the "no" result of decision box 402, if the desired rotational speed is not above the predetermined limit, the method performs the open-loop mode control shown in item 406. In item 406, the rotational coil current of the electric stepper motor 36 is controlled by setting the average voltage supplied to the electric stepper motor 36 according to values computed from the step frequency or rotational frequency input in item 400, irrespective of the observed feedback current from the current feedback loop. Item 406 is sometimes referred to as "voltage control" of the motor, because the only variable monitored is the supplied voltage pattern and the current within the motor is ignored. In item 406, the current sensing resistor 38 only acts as an over current protection element.

The closed-loop mode 404 uses feedback-based pulse width modulation to control the average voltage supplied to the electric stepper motor 36 so as to maintain sinusoidal current waveforms within the electric stepper motor 36. To the contrary, the open-loop mode control comprises supplying, to the electric stepper motor 36, sinusoidal voltage waveforms matching desired sinusoidal current waveforms corresponding to the desired rotational speed or step frequency input in item 400. The predetermined limit can be a rotational speed and/or a step frequency.

Thus, the above structure and method provides a solution to common sources of vibration by using open-loop control at slow speeds and closed-loop control at higher speeds. At high speeds, corresponding to high step frequency, the inertia of the rotor presents a high impedance to harmonic acceleration, so vibration is usually not an issue. This "fly wheel" effect allows satisfactory operation of the Chopper Current Controlling (closed-loop) driver, and imperfect motors, but only in the high range of speed. However, at low speeds there is a need to overcome the drawbacks of the Chopper Current Controlling driver, and also combat motor imperfections with some type of dampening system. The embodiments address this need by using open-loop control at low speeds. Regarding the driver circuit in FIG. 3, the motor coil 36 could be connected to the power supply 30 by either diagonal pair of transistors at all times. By varying the duty cycle between 0% and 100%, the average voltage applied to the motor coil is varied from negative 100% to positive 100% of the supply voltage. A 50% duty PWM (pulse width modulation) would place an average of zero volts across the coil. In this case the actual coil current never affects the drive current path, and so the drive is symmetrical.

By utilizing open-loop control at low speeds, the embodiments herein remove the timing restrictions that are required by having to sample the current feedback signal in synch with the switching of the transistors, which may cause dead band vibration issues. No conventional feedback setups provide solutions for the precision feedback needed at low speeds. However, by controlling the current open-loop, also known as a voltage controlling drive, the dead-band problems are eliminated.

When applying a sinusoidal voltage to the coils the current is expected to also be sinusoidal, with some time lag caused by inductance. However the current is also affected by back EMF. Because of back EMF, there is a need to increase the drive voltage amplitude in direct proportion to the motor velocity, at a rate set by the EMF constant of the motor. This voltage is added to the voltage necessary to drive the desired current through the resistance of the motor coil to compensate for back EMF.

However, the back EMF varies as the load angle fluctuates. Because of this fact, in open-loop control, the motor velocity vibration can be electronically dampened. In open-loop control, the generated back-EMF tends to force the coil currents to be modified in a direction that yields a torque opposing the velocity in the load angle. This is very different from the chopper current control situation (closed-loop mode) in which the current cannot be modified by back-EMF.

With the feedback loop that controls motor velocity in closed-loop mode, there are two time delays. One is the coil inductance that causes the current to vary as the integral of the difference between the applied voltage and the back EMF. The other is the rotor inertia that causes the velocity to vary as the integral of the current. At low motor speeds these time delays are insignificant, and the system approximates direct negative feedback, thus stabilizing velocity. However at higher speeds these delays become significant, to the point that feedback becomes positive, causing oscillation of velocity. For these reasons, the embodiments herein employ open-loop control at low speeds and closed-loop control at higher speeds. Thus, the embodiments herein use voltage control at low speeds for low vibration and high damping, and use current control for high speeds where vibration is not an issue. The drive controller 32 can switch between these methods on the fly as the desired rotational speed and step frequency change. Further, the useful speed ranges of these two drive methods do in fact overlap.

A standard "H" bridge circuit with a current sensing resistor (such as that shown in FIG. 3, discussed above) may be run in either mode, simply be altering the logic control (as shown in FIG. 4). In the case of voltage control, the current sense signal is not used for feedback, but can be used as part of an over-current protection mechanism, since a stalled motor will fail to produce the expected back EMF. Thus, the current sensing resistor will not allow the drive voltage to cause excessive currents and temperatures.

One feature of open-loop control (that permits very accurate current control) is that the current is very sensitive to the applied voltage. By using a symmetrical PWM driving method, very little can go wrong in the driver that would cause current errors at low speeds. In this way at low speeds, with open-loop control the current will be nearly ideal, except for its reaction to velocity perturbations that constitute the desired dampening effect on vibration. With open-loop control, the timing of the PWM signal transitions should performed accurately in order to achieve low vibration. Fortunately, since the timing is done in the digital realm, theoretical perfection is guaranteed.

The embodiments herein provide very good success in open-loop control when the PWM frequency is set to an integer multiple (harmonic) of the micro-stepping frequency. In this way, the PWM voltage of each micro-step is controlled by a pulse pattern that starts and ends in synch with the micro-step time period. By locking the PWM frequency onto a harmonic of the micro-stepping frequency in open-loop control, the embodiments herein eliminate vibrations or strange noises that appear in otherwise quiet parts of the frequency spectrum, as a result of mixing or modulation, such as beat frequencies or heterodynes.

On some examples, the range of PWM frequencies in open-loop control can run between the top of the audio range, where coil buzzing would be objectionable, up to the point where load capacitance and transistor switching speed cause excessive heating and current noise. In some examples in open-loop control, this range of PWM frequencies can be around 18 KHz to 40 KHz, and so it spans over one octave. However, as would be understood by those ordinarily skilled in the art, the embodiments are not limited to any ranges mentioned herein and are applicable to all ranges, whether now known or discovered in the future.

For example, in one embodiment, the integer in open-loop control can be based on the micro-stepping frequency and can be chosen, for any given motor speed, to cause the PWM frequency to fall into this predetermined frequency range. This could, for example allow a motor speed range of some ratio, such as 2:1, 4:1, etc. When the motor speed moves outside this frequency range, the integer can be adjusted by a factor (e.g. 2, 4, etc.) such that the PWM frequency stays within its intended range at all times. The adjustment by integer powers of 2 may be performed in the hardware, by shifting the binary bits, so as to avoid the need for a multiplier unit and its associated cost. In another embodiment, the range could be set to any integer ratio (e.g. 3, 5, etc.), and the same adjustment logic applied, but would require an integer multiplier unit.

At some point in open-loop control the motor speed becomes so high that in the time period of one micro step, there may be very few or even just one cycle of PWM. In this situation, the controller can start skipping every other micro step, since the micro-stepping rate may already be so high that the inertia of the rotor will prevent most vibration. On the contrary, when the motor speed becomes very low, vibration may be improved by using more micro-steps per cycle. The number of micro-steps used in open-loop mode is limited only by the size of the sine table.

This example has provided an open-loop control with a predetermined limit of between 18 and 40 KHz, where the PWM duty cycle must be controlled accurately. Again, the embodiments herein are not limited to this example. If it is necessary to provide a resolution of 1% of better, then the controller is set to count at least +/−100 increments (alternatively, 256 could be simpler) per PWM period, suggesting a master clock of at least 8 MHz, which is commonly available. As the PWM frequency goes down from here, to accommodate motor speed adjustments, the PWM period will occupy as much as twice the count, and the resolution will become twice as good.

As discussed in greater detail in U.S. Pat. No. 6,903,531 (incorporated herein by reference) the duty cycle in open-loop control can be arrived at in several ways, and can be achieved through multiplication. In the case of a microprocessor, open-loop control should ensure that multiplication occurs as seldom as possible, to reduce resource over-utilization (because in multiplication, the microprocessor needs to calculate a new sine table every time the motor speed changes). For example, the processor can start with a sine template that should be scaled to reflect the motor coil resistance, such that it produces the correct voltages for controlling the current at zero velocity. The new table values are the template values multiplied by one plus a speed value. This speed value is the motor speed, in any units, multiplied by a constant that reflects the EMF constant of the motor itself. In this way, in open-loop control the multiplication software can be executed only when motor speeds are changed.

Alternatively, in open-loop control the hardware can be established so that the PWM generator free-runs with the period and duty values in its register, while a second counter counts the cycles. When a micro-step has counted off, the terminal count issues a direct memory access (DMA) request that moves the next set of values from the calculated table into the loading registers for PWM. All three of these devices repeat their actions. The software that prepares the values would keep two destination tables, and a speed change would be enacted simply by changing a DMA pointer register to point to the newer of the two tables.

Using a field programmable gate array (FPGA) with embodiments herein provides more flexiblily by not limiting the number of motors to the resources of the microprocessor. FPGA's can also save many pins on the processor. Further, the motor parameters can be held in their own registers, making this chip completely customizable. Beyond this, FPGA's can use the current feedback comparator as the basis for a successive approximation register, whereby the motor's resistance can be stored when first powering up the coils, and then the EMF constant can be recorded as the motor speeds up. In this way, all the user needs to select for the application is the operating current, and the mode change speed.

In open-loop control, when dealing with speeds that are not too low, it is possible to avoid using resources for multiplication. This is based on the fact that at all but the lowest speeds, the coil resistance is insignificant when compared to the back-EMF. Therefore, it is adequate to simply multiply the sine table values by the speed, and ignore resistance. This multiplication need not consume resources, because the table values can be directly added or subtracted from the 50% duty value in order to establish the on-time. Since the cycle time is inversely proportional to speed, the relative effect of the table value on the duty cycle rises with speed, and therefore is inherently multiplied. Also, since the cycle time is always twice the 50% duty value, a simple shift left is all that is needed with this set up.

With the dual-mode embodiments described herein, the motor runs cooler in voltage mode for a given torque ability, and there is a lower average power requirement in voltage mode, in addition to less vibration. The embodiments herein save the expense and bulk of mechanical dampers, and provide a greatly extended useful speed range. These embodiments replace mechanical gear shifters, and reduce the need for speed variants in product inventory. They also allow direct drive, and avoid gear and/or pulley tooth vibration by eliminating their necessity.

The embodiments herein are applicable to all motors, such as stepper motors. For example, stepper motors are often used in printers or image output terminals. The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. All foregoing embodiments are specifically applicable to electrostatographic and/or xerographic machines and/or processes and can comprise hardware or software. For example, the method steps discussed herein can be included within a computer program product within the processor 32. The computer program produce could comprise a computer-usable data carrier storing instructions that, when executed by a computer, cause the computer to perform the various method discussed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A machine-implemented method comprising:
   receiving a desired rotational speed of an electric motor;
   if said desired rotational speed is above a predetermined limit, performing closed-loop mode control of coil current of said electric motor using a controller by varying an average voltage supplied to said electric motor according to observed feedback current from a current feedback loop connected to said electric motor; and
   if said desired rotational speed is not above said predetermined limit, performing open-loop mode control of said coil current of said electric motor using said controller by varying said average voltage supplied to said electric motor based on said desired rotational speed, irrespective of said observed feedback current from said current feedback loop; and wherein varying said average voltage comprises using symmetrical pulse width modulation in which the pulse width modulation frequency is set to an integer multiple of a micro-stepping frequency associated with the desired rotational speed.

2. The method according to claim 1, wherein said closed-loop mode control comprises using feedback-based pulse width modulation to control said average voltage supplied to said electric motor so as to maintain sinusoidal current waveforms within said electric motor.

3. The method according to claim 1, wherein said open-loop mode control comprises supplying, to said electric motor, sinusoidal voltage waveforms matching desired sinusoidal current waveforms corresponding to said desired rotational speed.

4. The method according to claim 1, wherein said open-loop mode control further comprises providing over-current protection using said current feedback loop.

5. The method according to claim 1, wherein said predetermined limit comprises one of a step frequency and a revolution frequency.

6. A machine-implemented method comprising:
receiving a desired rotational speed and step frequency of an electric stepper motor;
if said desired rotational speed is above a predetermined limit, performing closed-loop mode control of coil current of said electric stepper motor using a controller by varying an average voltage supplied to said electric stepper motor according to observed feedback current from a current feedback loop connected to said electric stepper motor; and
if said desired rotational speed is not above said predetermined limit, performing open-loop mode control of coil current of said electric stepper motor using said controller by setting said average of said voltage supplied to said electric stepper motor according to values computed from said step frequency, irrespective of said observed feedback current from said current feedback loop, and
wherein setting said average voltage comprises using symmetrical pulse width modulation in which the pulse width modulation frequency is set to an integer multiple of a micro-stepping frequency associated with the desired rotational speed.

7. The method according to claim 6, wherein said closed-loop mode control comprises using feedback-based pulse width modulation to control said average voltage supplied to said electric stepper motor so as to maintain sinusoidal current waveforms within said electric stepper motor.

8. The method according to claim 6, wherein said open-loop mode control comprises supplying, to said electric stepper motor, sinusoidal voltage waveforms matching desired sinusoidal current waveforms corresponding to said desired rotational speed.

9. The method according to claim 6, wherein said open-loop mode control further comprises providing over-current protection using said current feedback loop.

10. The method according to claim 6, wherein said predetermined limit comprises one of a step frequency and a revolution frequency.

11. An apparatus comprising:
an electric motor;
a controller operatively connected to said electric motor, said controller being adapted to supply a pattern of voltage to said electric motor, and said controller having an input/output for receiving a desired rotational speed of said electric motor; and
a current feedback loop connected to said electric motor and said controller,
wherein said controller is adapted to perform closed-loop mode control of said coil current of said electric motor by varying an average voltage supplied to said electric motor according to observed feedback current from said current feedback loop, if said desired rotational speed is above a predetermined limit; and
wherein said controller is adapted to perform open-loop mode control of coil current of said electric motor by setting said average of said voltage supplied to said electric motor based on said desired rotational speed, irrespective of said observed feedback current from said current feedback loop, if said desired rotational speed is not above said predetermined limit; and
wherein setting said average voltage comprises using symmetrical pulse width modulation in which the pulse width modulation frequency is set to an integer multiple of a micro-stepping frequency associated with the desired rotational speed.

12. The apparatus according to claim 11, wherein said controller is further adapted to perform said closed-loop mode control using feedback-based pulse width modulation to control said average voltage supplied to said electric motor so as to maintain sinusoidal current waveforms within said electric motor.

13. The apparatus according to claim 11, wherein said controller is further adapted to perform said open-loop mode control to supply, from said controller to said electric motor, sinusoidal voltage waveforms matching desired sinusoidal current waveforms corresponding to said desired rotational speed.

14. The apparatus according to claim 11, wherein said current feedback loop is adapted to provide over-current protection during said open-loop mode control.

15. The apparatus according to claim 11, wherein said predetermined limit comprises one of a step frequency and a revolution frequency.

16. An apparatus comprising:
an electric motor;
a controller operatively connected to said electric motor, said controller being adapted to supply a pattern of voltage to said electric motor, and said controller having an input/output for receiving a desired rotational speed and step frequency of said electric motor; and
a current feedback loop connected to said electric motor and said controller,
wherein said controller is adapted to perform closed-loop mode control of coil current of said electric motor by varying an average of said voltage supplied to said electric motor according to observed feedback current from said current feedback loop, if said desired rotational speed is above a predetermined limit; and
wherein said controller is adapted to perform open-loop mode control of said coil current of said electric motor by setting said average of said voltage supplied to said electric motor according to values computed from said step frequency, irrespective of said observed feedback current from said current feedback loop, if said desired rotational speed is not above said predetermined limit; and wherein setting said average voltage comprises using symmetrical pulse width modulation in which the pulse width modulation frequency is set to an integer multiple of a micro-stepping frequency associated with the desired rotational speed.

17. The apparatus according to claim 16, wherein said controller is further adapted to perform said closed-loop mode control using feedback-based pulse width modulation to control said average voltage supplied to said electric motor so as to maintain sinusoidal current waveforms within said electric motor.

18. The apparatus according to claim 16, wherein said controller is further adapted to perform said open-loop mode control to supply, from said controller to said electric motor, sinusoidal voltage waveforms matching desired sinusoidal current waveforms corresponding to said desired rotational speed.

19. The apparatus according to claim 16, wherein said current feedback loop is adapted to provide over-current protection during said open-loop mode control.

20. A computer program product comprising:

a computer-usable data carrier storing instructions that, when executed by a computer, cause said computer to perform a method comprising:

receiving a desired rotational speed of an electric motor;

if said desired rotational speed is above a predetermined limit, performing closed-loop mode control of coil current of said electric motor by varying an average voltage supplied to said electric motor according to observed feedback current from a current feedback loop connected to said electric motor; and if said desired rotational speed is not above said predetermined limit, performing open-loop mode control of said coil current of said electric motor by varying said average voltage supplied to said electric motor, irrespective of said observed feedback current from said current feedback loop; and wherein setting said average voltage comprises using symmetrical pulse width modulation in which the pulse width modulation frequency is set to an integer multiple of a micro-stepping frequency associated with the desired rotational speed.

* * * * *